(12) United States Patent  (10) Patent No.: US 6,738,038 B2
Hong  (45) Date of Patent: May 18, 2004

(54) STRUCTURE COMBINING TOUCH CONTROLLER WITH LCD MODULE CONTROLLER IN A TOUCH PANEL LCD

(75) Inventor: Hee Jung Hong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 313 days.

(21) Appl. No.: 10/028,983

(22) Filed: Dec. 28, 2001

(65) Prior Publication Data

US 2002/0089493 A1 Jul. 11, 2002

(30) Foreign Application Priority Data

Dec. 29, 2000 (KR) ........................................ 2000-85764

(51) Int. Cl.[7] ................................................. G09G 3/36
(52) U.S. Cl. ......................................... 345/104; 349/56
(58) Field of Search ................................ 345/102, 104, 345/173, 204; 178/18.01, 18.1; 349/56, 58, 61

(56) References Cited

U.S. PATENT DOCUMENTS 5,280,372 A * 1/1994 Horiuchi ...................... 349/65
5,375,005 A * 12/1994 Komano ...................... 349/58
6,515,721 B2 * 2/2003 Jin et al. ...................... 349/58
2003/0090803 A1 * 5/2003 Kusuda ...................... 359/601

FOREIGN PATENT DOCUMENTS

JP     02001183671    *  7/2001

* cited by examiner

*Primary Examiner*—Kent Chang
(74) *Attorney, Agent, or Firm*—McKenna Long & Aldridge LLP

(57) ABSTRACT

The present invention provides a structure combining a touch controller with an LCD module controller in an LCD integrated with a touch panel, which can avoid a limitation on fitting space of the touch controller by integrating the touch controller and the LCD module controller on one printed circuit board (PCB) and improve signal line connection between the touch panel and the touch controller, to allow fabrication of a thinner LCD with the touch panel. The present invention provides a structure of combining a touch controller with an LCD module controller in an LCD integrated with a touch panel, the LCD having the touch panel, an LCD module, and a back light, including a PCB (Printed Circuit Board) on a rear surface of the back light, having the LCD module controller, and the touch controller integrated with the PCB.

18 Claims, 4 Drawing Sheets

STRUCTURE COMBINING TOUCH CONTROLLER WITH LCD MODULE CONTROLLER IN A TOUCH PANEL LCD

This application claims the benefit of Korean Patent Application No. P2000-85764, filed on Dec. 29, 2000, which is hereby incorporated by reference for all purposes as if fully set forth herein.

BACKGROUND OF THE INVENTION

1. Field of the Invention

The present invention relates to an LCD (Liquid Crystal Display) panel integrated with a touch panel, herein referred to as a touch panel LCD, and more particularly, to a structure combining a touch controller with an LCD module controller of a touch panel LCD, which can avoid exceeding spatial limitations required for fitting the touch controller operably proximate the LCD module controller, and permit fabrication of a thin LCD.

2. Discussion of the Related Art

In general, referring to FIGS. 1, and 2, a related art touch panel LCD is provided with a touch panel 1, an LCD module 2, and a back light 3. To operate the touch panel LCD, the touch panel 1 and the touch controller 4 are electrically connected by signal lines 7 and the touch controller 4 is electrically connected to the computer body 5. The related art touch panel LCD is provided with a separate touch panel 1, LCD module 2, touch controller 4, and computer body 5. Accordingly, the related art requires that a location, where the touch controller 4 is to be fitted and connected to the touch panel 1, is provided outside the touch panel 1 as shown in FIG. 2.

In the case of notebook computers or other devices having a touch panel LCD, which do not have such a space outside a touch panel for connecting to a touch controller, the touch controller must be fitted to a rear surface of the back light 3. However, a connector (not shown) used to connect the signal lines 7 from the touch panel 1 to the touch controller 4 has a height greater than an integrated circuit (IC) part 10 fixed to a PCB (Printed Circuit Board) 6 of the touch controller. Therefore, the height of the connector undesirably increases the total thickness of the touch panel LCD.

SUMMARY OF THE INVENTION

Accordingly, the present invention is directed to a structure combining a touch controller and an LCD module controller in a touch panel LCD that substantially obviates one or more of the problems due to limitations and disadvantages of the related art.

An advantage of the present invention provides a structure combining a touch controller and an LCD module controller in a touch panel LCD, which can avoid exceeding spatial limitations required for fitting the touch controller operably proximate the LCD module controller, improve signal line connection between the touch panel and the touch controller, and permit fabrication of a thin touch panel LCD.

Additional features and advantages of the invention will be set forth in the description which follows and, in part, will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the structure combines a touch controller with an LCD module controller in a touch panel LCD, the touch panel LCD including a touch panel, an LCD module, and a back light having a PCB (Printed Circuit Board) mounted on a rear surface thereof, wherein the LCD module controller and the touch controller are integrated thereto.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to an embodiment of the present invention, an example of which is illustrated in the accompanying drawings.

Figure 1:
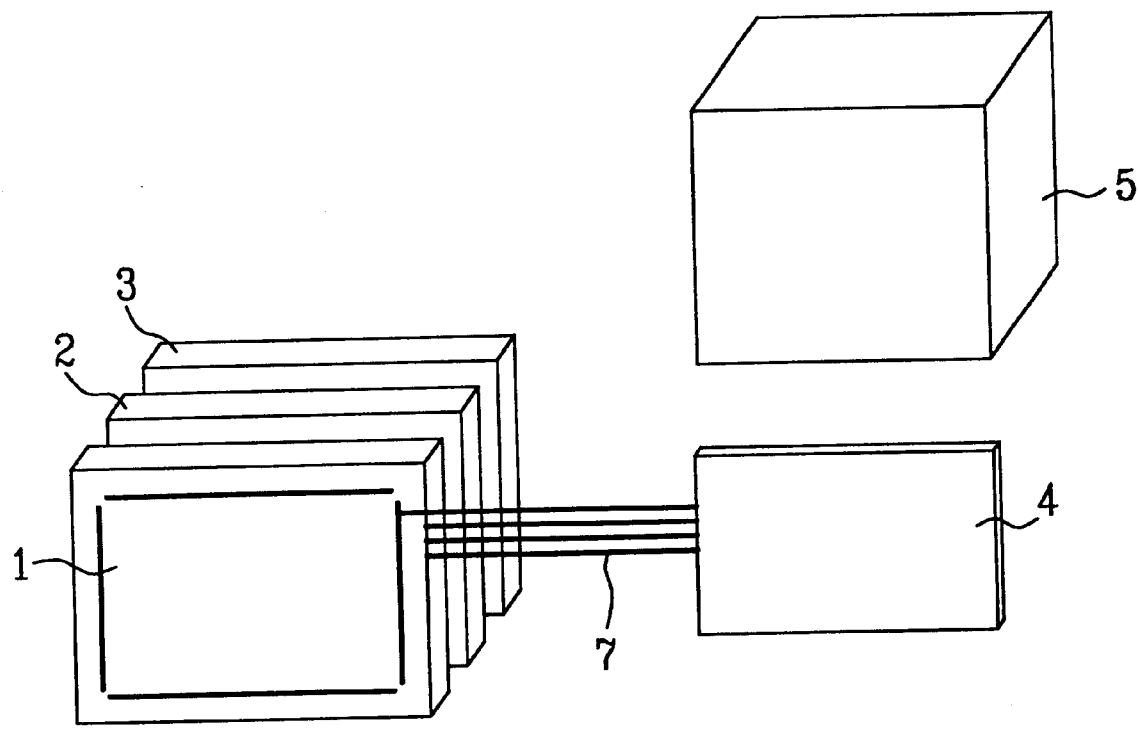
FIG. 1 illustrates a schematic view of a related art system required for operation of an LCD with a touch panel.
Figure 2:
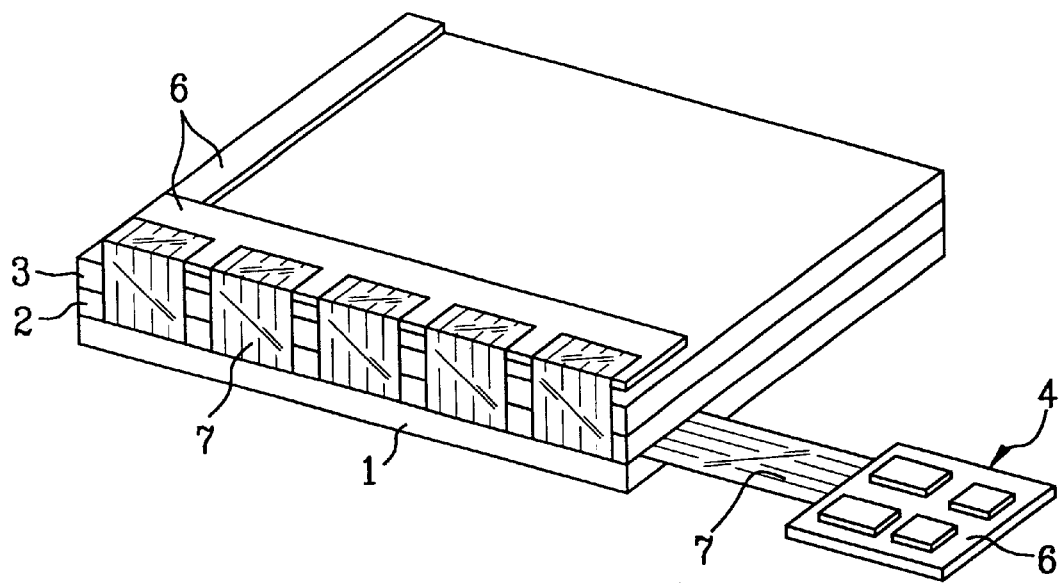
FIG. 2 illustrates a perspective rear view of a related art LCD with a touch panel.
Figure 3:
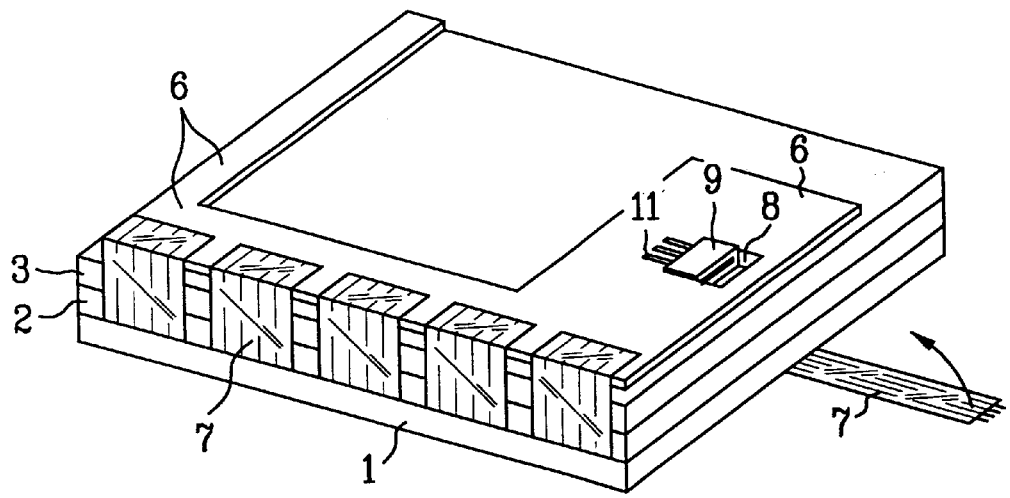
FIG. 3 illustrates a perspective view of a disassembled a structure combining a touch controller with an LCD module controller in a touch panel LCD in accordance with the principles of the present invention.
Figure 4:
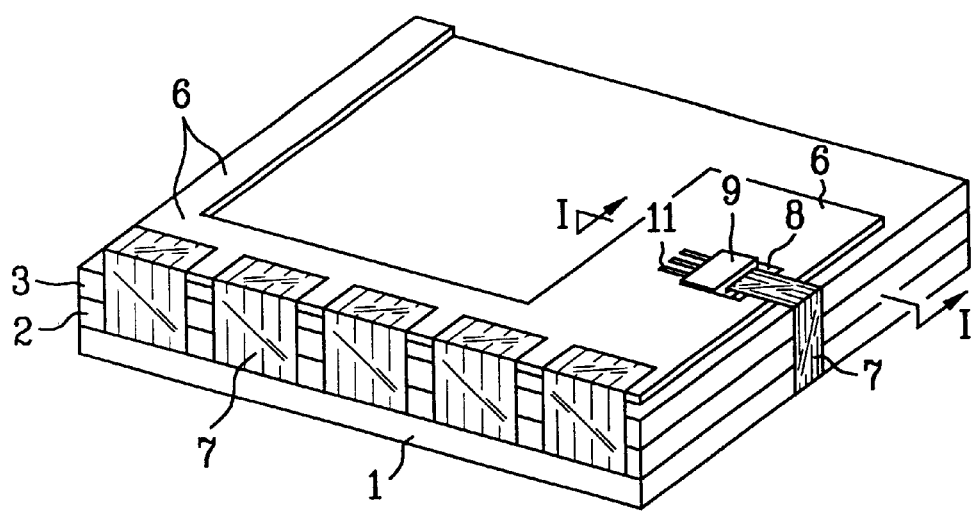
FIG. 4 illustrates a perspective view of the signal lines connected to the connector in FIG. 3.
Figure 5:
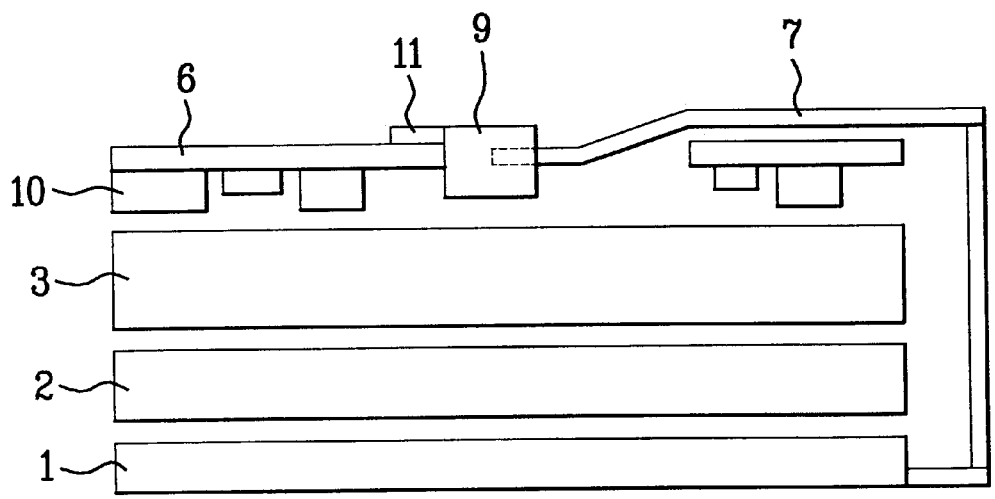
FIG. 5 illustrates a sectional view across line I—I in FIG. 4.

FIG. 3 illustrates a perspective view of a disassembled structure combining a touch controller with an LCD module controller in an LCD integrated with a touch panel, herein referred to as a touch panel LCD, in accordance principles of the present invention. FIG. 4 illustrates a perspective view showing signal lines 7 connected to the connector 9 in FIG. 3. FIG. 5 illustrates a sectional view across line I—I in FIG. 4. In accordance with the principles of the present invention, a structure combining a touch controller with an LCD module controller in a touch panel LCD, includes a touch panel 1, an LCD module 2, and a back light 3 with a PCB (Printed Circuit Board) 6 mounted on a rear surface of the liquid crystal display, wherein the LCD module controller and the touch controller are integrated with the PCB 6. The PCB 6, having the LCD module controller and the touch controller integrated with the PCB 6, includes a connector inserting hole 8 to accommodate a connector 9 inserted thereinto. Terminals of the connector 9 are soldered to patterned lines on the PCB 6 to establish electrical connection 11 between the terminals and the patterned lines.

The structure combining the touch controller with the LCD module controller in the touch panel LCD in accordance with the principles of the present invention will now be explained.

Referring to FIG. 3, an exemplary embodiment of the present invention integrates the LCD module controller (i.e., a source PCB, or a gate PCB) and the touch controller to one PCB 6.

Accordingly, a surface of the PCB 6, having parts 10 including ICs and the like fixed thereon and having the LCD module controller and the touch controller integrated thereto, may or may not be exposed. The latter case is shown in FIG. 3. When the surface of the PCB 6 is exposed, there is no problem in connecting the signal lines 7 from the touch panel 1 to the connector 9, even if the connector 9 is exposed to outside of the PCB 6. However, as shown in FIG. 5, when the surface of the PCB 6 is not exposed, many problems are encountered in connecting the signal lines 7 from the touch panel 1 to the connector 9.

Therefore, as shown in FIGS. 3–5, a connector inserting hole 8 is formed in the PCB 6 to accommodate a connector 9 inserted thereinto. Signal lines 7 from the touch panel 1 are then inserted into the connector 9 disposed within the depths of the connector inserting hole 8 and the touch panel 1 is in electrical communication with the touch controller.

Due to the related art connector being fitted to the rear surface of the PCB 6, the related art touch panel LCD has a total thickness equal to the sum of the thickness of the PCB 6 and a height of the connector 9. The total thickness of the touch panel LCD according to the principles of the present invention can be comparably reduced because the connector 9 is inserted within the connector inserting hole 8 formed in the PCB 6. Furthermore, the connector 9 can be inserted to a depth within the connector inserting hole such that the connector 9 is almost flush with respect to an exposed top major surface of the PCB 6.

Figure 6:
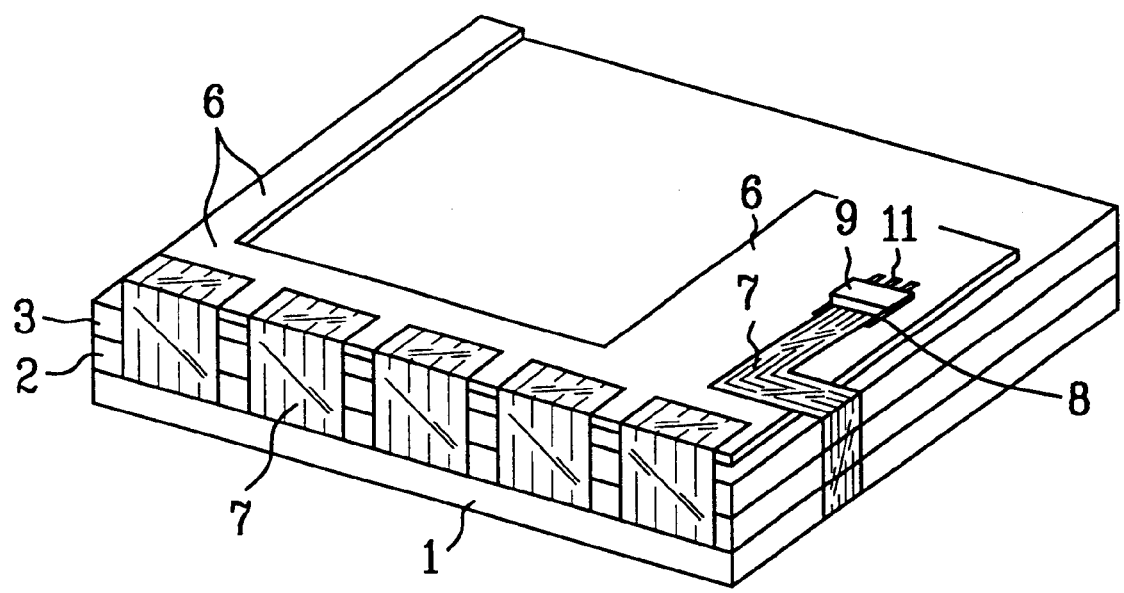
FIG. 6 illustrates another perspective view according to the principles of the present invention.

FIG. 6 illustrates another perspective view according to the principles of the present invention in which the signal lines 7 are disposed in a form different from the previous embodiment.

The signal lines 7, which are inserted in and electrically connected to the connector 9, may be bent to reduce any electrical interference with the connector 9, with the patterned lines on the PCB, or with other IC parts 10 fitted thereto, or with the touch controller and the LCD module controller integrated thereto.

According to another principle of the present invention, the signal lines 7 are fixed intimately to a top major surface of the PCB 6. Although not shown, a signal guide groove may be formed in the top major surface of the PCB 6, to prevent projection of the signal lines 7 from the top major surface of the PCB 6. Also, it is possible to change the location of the soldered electrical connection 11 provided between the connector 9 and the PCB 6 to the surface of the PCB 6 whereto the IC parts are fixed. Accordingly, the connector 9 may be inserted into the connector inserting hole 8 such that the connector does not protrude from the top major surface of the PCB 6.

As has been explained, the structure combining a touch controller with an LCD module controller in a touch panel LCD according to the principles of the present invention has the following advantages.

The present invention integrates a touch controller of a touch panel and an LCD module controller of an LCD module into one PCB of a touch panel LCD and improves a signal line connecting structure between the touch panel and the touch controller. Accordingly, the present invention can avoid exceeding spatial limitations required for fitting the touch panel and the touch controller within a notebook computer or other electronic device having a touch panel LCD, permit fabrication of a thin touch panel LCD, and enhance the reliability of the touch panel LCD product.

It will be apparent to those skilled in the art that various modifications and variations can be made in the structure of combining a touch controller with an LCD module controller in an LCD integrated with a touch panel of the present invention without departing from the spirit or scope of the invention. Thus, it is intended that the present invention cover the modifications and variations of this invention provided they come within the scope of the appended claims and their equivalents.

What is claimed is:

1. A structure combining a touch controller and an LCD module controller in a touch panel LCD, the touch panel LCD comprising:

a touch panel;

an LCD module;

a back light; and a printed circuit board on a rear surface of the back light, wherein the LCD module controller and the touch controller are integrated to the PCB.

2. The structure as claimed in claim 1, wherein the printed circuit board having the LCD module controller and the touch controller integrated thereto further comprises:

a connector inserting hole; and a connector disposed within the connector inserting hole, the connector being connected to the printed circuit board.

3. The structure as claimed in claim 2, wherein the connector is disposed within the connector inserting hole such that the connector does not protrude from an exposed top major surface of the printed circuit board.

4. The structure as claimed in claim 2, wherein the connector is electrically connected to the printed circuit board via terminals of the connector.

5. The structure as claimed in claim 4, wherein the terminals of the connector are soldered to patterned lines on the printed circuit board.

6. The structure as claimed in claim 2, further comprising:

the touch panel comprising signal lines;

the connector comprising terminals, wherein the signal lines are disposed on a surface of the printed circuit board while being connected to the terminals of the connector.

7. The structure as claimed in claim 6, wherein the printed circuit board includes a guide groove, wherein the signal lines are disposed within the guide groove and do not project from an exposed major surface of the printed circuit board.

8. A touch panel LCD in an electronic device, the touch panel LCD combining a touch controller and an LCD module controller, the touch panel LCD comprising:

a touch panel;

an LCD module;

a back light; and a printed circuit board over a rear surface of the back light; and an LCD module controller and a touch controller integrated on the printed circuit board.

9. The touch panel LCD as claimed in claim 8, wherein the printed circuit board further comprises:

a connector inserting hole; and a connector disposed within the connector inserting hole, the connector being connected to the printed circuit board.

10. The touch panel LCD as claimed in claim 9, wherein the connector is disposed within the connector inserting hole such that the connector does not protrude from an exposed top major surface of the printed circuit board.

11. The touch panel LCD as claimed in claim 9, wherein the connector is electrically connected to the printed circuit board via terminals of the connector.

12. The touch panel LCD as claimed in claim 11, wherein the terminals of the connector are soldered to patterned lines on the printed circuit board.

13. The touch panel LCD as claimed in claim 9, further comprising:

the touch panel comprising signal lines;

the connector comprising terminals, wherein the signal lines are disposed on a surface of the printed circuit board while being connected to the terminals of the connector.

14. The structure as claimed in claim 13, wherein the printed circuit board includes a guide groove, wherein the signal lines are disposed within the guide groove and do not project from an exposed major surface of the printed circuit board.

15. A method of fabricating a touch panel LCD in an electronic device combining a touch controller and an LCD module controller in a touch panel LCD, the method comprising:

providing a touch panel;

disposing an LCD module proximate the touch panel;

disposing a back light proximate the LCD module;

disposing a printed circuit board over a rear surface of the back light, wherein the printed circuit board comprises an LCD module controller and a touch controller integrated thereto, the printed circuit board being electrically connected to the touch panel.

16. The method according to claim 15, further comprising:

forming a connector inserting hole within the printed circuit board;

inserting a connector within the connector inserting hole; and electrically connecting the printed circuit board to the touch panel via the connector.

17. The method according to claim 16, wherein the connector is inserted within the connector inserting hole such that the connector does not protrude from an exposed top major surface of the printed circuit board.

18. The method according to claim 16, further comprising:

the touch panel comprising signal lines electrically connecting to the connector;

the printed circuit board comprises a guide groove, the signal lines are disposed within the guide groove.

* * * * *